(12) United States Patent
Sun et al.

(10) Patent No.: US 10,079,709 B2
(45) Date of Patent: Sep. 18, 2018

(54) PHYSICAL LAYER DATA UNIT FORMAT FOR A WIRELESS COMMUNICATION NETWORK

(71) Applicant: Marvell World Trade Ltd., St. Michael (BB)

(72) Inventors: Yakun Sun, Sunnyvale, CA (US); Hongyuan Zhang, Fremont, CA (US); Hui-Ling Lou, Sunnyvale, CA (US); Kwok S. Au, Shenzhen (CN)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/236,242

(22) Filed: Aug. 12, 2016

(65) Prior Publication Data

US 2017/0048095 A1     Feb. 16, 2017

Related U.S. Application Data

(60) Provisional application No. 62/205,132, filed on Aug. 14, 2015.

(51) Int. Cl.
*H04K 1/10* (2006.01)
*H04L 27/28* (2006.01)
(Continued)

(52) U.S. Cl.
CPC ........ *H04L 27/2692* (2013.01); *H04L 5/0007* (2013.01); *H04L 5/0053* (2013.01);
(Continued)

(58) Field of Classification Search
CPC .................... H04L 27/2601; H04L 27/2602
See application file for complete search history.

(56) References Cited

U.S. PATENT DOCUMENTS 7,599,332 B2   10/2009   Zelst et al.
7,742,390 B2    6/2010   Mujtaba
(Continued)

FOREIGN PATENT DOCUMENTS

WO   WO-2009/059229   5/2009
WO   WO-2012/122119   9/2012

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Chieh M Fan
*Assistant Examiner* — Gina McKie

(57) ABSTRACT

In a method for generating a data unit, it is determined whether the data unit is to be transmitted using single carrier (SC) modulation or orthogonal frequency division (OFDM) modulation. When it is determined that the data unit is to be transmitted using SC modulation, a header field of the data unit is generated using a first technique to indicate that the data unit conforms to a first protocol and/or whether the data unit conforms to a first PHY mode or a second PHY mode of the first protocol. When it is determined that the data unit is to be transmitted using OFDM modulation, the header field is generated using a second technique to indicate that the data unit conforms to the first protocol and/or whether the data unit conforms to the first PHY mode or the second PHY mode of the first protocol.

20 Claims, 8 Drawing Sheets

(51) Int. Cl.
*H04L 27/26* (2006.01)
*H04L 5/00* (2006.01)
*H04W 84/12* (2009.01)
*H04J 11/00* (2006.01)

(52) U.S. Cl.
CPC ...... *H04L 27/2636* (2013.01); *H04L 27/2643* (2013.01); *H04L 27/2646* (2013.01); *H04J 2011/0009* (2013.01); *H04L 27/261* (2013.01); *H04W 84/12* (2013.01)

(56) References Cited

U.S. PATENT DOCUMENTS

| | | | |
|---|---|---|---|
| 8,155,138 | B2 | 4/2012 | van Nee |
| 8,289,869 | B2 | 10/2012 | Sawai |
| 8,331,419 | B2 | 12/2012 | Zhang et al. |
| 8,332,732 | B2 | 12/2012 | Lakkis |
| 8,339,978 | B2 | 12/2012 | Sawai et al. |
| 8,526,351 | B2 | 9/2013 | Fischer et al. |
| 8,527,853 | B2 | 9/2013 | Lakkis |
| 8,599,804 | B2 | 12/2013 | Erceg et al. |
| 8,619,907 | B2 | 12/2013 | Mujtaba et al. |
| 8,724,720 | B2 | 5/2014 | Srinivasa et al. |
| 8,867,653 | B2 | 10/2014 | Zhang et al. |
| 8,948,283 | B2 | 2/2015 | Zhang |
| 8,982,889 | B2 | 3/2015 | Zhang |
| 9,130,727 | B2 | 9/2015 | Zhang et al. |
| 9,197,298 | B2 | 11/2015 | Kim et al. |
| 9,258,178 | B2 | 2/2016 | Zhang |
| 2005/0138194 | A1* | 6/2005 | Lu ............................. H04L 29/06 709/230 |
| 2005/0190724 | A1 | 9/2005 | Hansen et al. |
| 2005/0276347 | A1* | 12/2005 | Mujtaba ............... H04B 7/0667 375/299 |
| 2009/0196163 | A1 | 8/2009 | Du |
| 2010/0002792 | A1* | 1/2010 | Seyedi-Esfahani .......................... H03M 13/2721 375/260 |
| 2010/0046656 | A1 | 2/2010 | van Nee et al. |
| 2010/0054223 | A1 | 3/2010 | Zhang et al. |
| 2010/0260159 | A1 | 10/2010 | Zhang et al. |
| 2016/0323058 | A1* | 11/2016 | Cordeiro ............... H04L 1/0003 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., pp. 1-601 (Sep. 2011).

IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band The Institute of Electrical and Electronics Engineers, Inc., pp. 1-679 (Jul. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., pp. 1-123 (Nov. 2011).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," The Institute of Electrical and Electronics Engineers, Inc., pp. 1-394 (Oct. 2013).

IEEE P802.11ah™/D1.3 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," The Institute of Electrical and Electronics Engineers, Inc., pp. 1-466 (Apr. 2014).

IEEE P802.11ah™/D5.0 "Draft Standard for Information Technology—Telecommunications and information exchange between systems Local and metropolitan area networks—Specific requirements, Part 11: Wireless LAN Medium Access Control (MAC) and Physical Layer (PHY) Specifications: Amendment 2: Sub 1 GHz License Exempt Operation," The Institute of Electrical and Electronics Engineers, Inc., pp. 1-632 (Mar. 2015).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

Chen, "Home Network Basis: Transmission Environments and Wired/Wireless Protocols," Prentice Hall, pp. 1-26 (Jul. 2006).

Chun et al., "Legacy Support on HEW frame structure," doc: IEEE 11-13/1057r0, The Institute of Electrical and Electronics Engineers, Inc., pp. 1-8 (Sep. 2013).

de Vegt, "Potential Compromise for 802.11ah Use Case Document", Institute of Electrical and Electronics Engineers, doc. No. IEEE 802.11-11/0457r0, pp. 1-27 (Mar. 2011).

Harada, "Project: IEEE P802.15 Working Group for Wireless Personal Area Network (WPANs)," IEEE 802.15-07-0693-003c, slides 24-33 (May 2007).

Hiertz et al., "The IEEE 802.11 Universe," IEEE Communications Magazine, pp. 62-70, (Jan. 2010).

Imashioya et al., "RTL Design of 1.2 Gbps MIMO WLAN System and Its Business Aspect," IEEE 9th Int'l Symposium on Communications and Information Technology (ISCIT 2009), The Institute of Electrical and Electronics Engineers, pp. 296-301 (2009).

Lee et al., "TGaf PHY proposal," The Institute of Electrical and Electronics Engineers, doc. No. IEEE 802.11-12/0809r5, pp. 1-43 (Jul. 10, 2012).

(56) References Cited

OTHER PUBLICATIONS

Mujtaba, "IEEE P802.11—Wireless LANs, TGn Sync Proposal Technical Specification," The Institute of Electrical and Electronics Engineers, Inc., doc.: IEEE 802.11-04/0889r6, pp. 1-131 (May 2005).
Park et al., "Low Power Capability Support for 802.11ah," doc. No. IEEE 802.11-11/0060r1, The Institute for Electrical and Electronics Engineers, 7 pages (Jan. 17, 2011).
Park, "Proposed Specification Framework for TGah D9.x", The Institute of Electrical and Electronics Engineers, doc. No. IEEE 802.11-yy/xxxxr0, pp. 1-30 (Jul. 2012).
Park, "Proposed Specification Framework for TGah", The Institute of Electrical and Electronics Engineers, doc. No. IEEE 802.11—yy/xxxxr05, pp. 1-12 (Jan. 2012).
Park, "Proposed Specification Framework for TGah", The Institute of Electrical and Electronics Engineers, doc. No. IEEE 802.11-11/1137r11, pp. 1-36 (Sep. 2012).
Park, "Proposed Specification Framework for TGah", The Institute of Electrical and Electronics Engineers, doc. No. IEEE 802.11-11/1137r6, pp. 1-13 (Mar. 2012).
Park, "Specification Framework for TGah," The Institute of Electrical and Electronics Engineers, doc. No. IEEE 802.11-11/1137r13, pp. 1-58 (Jan. 14, 2013).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Seok et al., "HEW PPDU Format for Supporting MIMO-OFDMA," IEEE 802.11-14/1210r0, 16 pages, (Sep. 14, 2014).
Shao, "Channel Selection for 802.11ah," doc.: IEEE 802.11-12/0816r0, pp. 1-11 (Jul. 2012).
Shi et al., "Phase Tracking During VHT-LTF," Doc. No. IEEE 802.11-10/0771r0, The Institute of Electrical and Electronics Engineers, Inc., pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, Institute for Electrical and Electronics Engineers, pp. 1-49, (Jan. 18, 2011).
Syafei et al., "A Design of Next Generation Gigabit MIMO Wireless LAN System ," IEEE 12th Int'l Conference on Advanced Communication Technology (ICACT 2010), The Institute of Electrical and Electronics Engineers, pp. 941-946 (2010).
Syafei et al., "A Gigabit MIMO WLAN System with International Standardization Strategy," IEEE Int'l Symposium on Intelligent Signal Processing and Communication Systems (ISPACS 2009), The Institute of Electrical and Electronics Engineers, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).
Taghavi et al., "Introductory Submission for TGah", doc. No. IEEE 802.11-11/0062r0, Institute for Electrical and Electronics Engineers, pp. 1-5 (Jan. 14, 2011).
van Nee et al. "The 802.11 n MIMO-OFDM Standard for Wireless LAN and Beyond," Wireless Personal Communications, vol. 37, pp. 445-453 (Jun. 2006).
van Zelst et al., "Pilot Sequence for VHT-DATA," Doc. No. IEEE 802.11-10/0811r1, The Institute of Electrical and Electronics Engineers, Inc., pp. 1-10 (Jul. 2010).
Vermani et al. "Preamble Format for 1 MHz," The Institute of Electrical and Electronics Engineers, doc. No. IEEE 802.11-11/1482r2, pp. 1-30 (Nov. 2011).
Vermani et al. "Spec Framework Text for PHY Numerology," The Institute of Electrical and Electronics Engineers, doc. No. IEEE 802.11-11/1311r0, pp. 1-5 (Sep. 2011).
Wu et al. "Rotation Modulation Application to 802.11ac system," IEEE 802/11-10/1256r0, 16 pages (Nov. 2010).
Yu et al., "Coverage extension for IEEE802.11ah," The Institute of Electrical and Electronics Engineers, doc. No. IEEE 802.11-11/0035r1 , pp. 1-10 (Jan. 2011).
Zhang et al., "11ah Data Transmission Flow," The Institute of Electrical and Electronics Engineers, doc. No. IEEE 802.11-11/1484r1, pp. 1-15 (Nov. 2011).
Zhang et al., "1 MHz Waveform in Wider BW", The Institute of Electrical and Electronics Engineers, doc. No. IEEE 802.11-12/0309r1, pp. 1-10 (Mar. 2012).
Zhang et al., "Beamforming Feedback for Single Stream," The Institute of Electrical and Electronics Engineers, doc. No. IEEE 802.11-12/1312r0, pp. 1-22 (Nov. 12, 2012).
International Search Report and Written Opinion in International Application No. PCT/US2016/046893, dated Oct. 31, 2016 (13 pages).
International Preliminary Report on Patentability in International Patent Application No. PCT/US2016/046893, dated Feb. 20, 2018 (8 pages).

\* cited by examiner

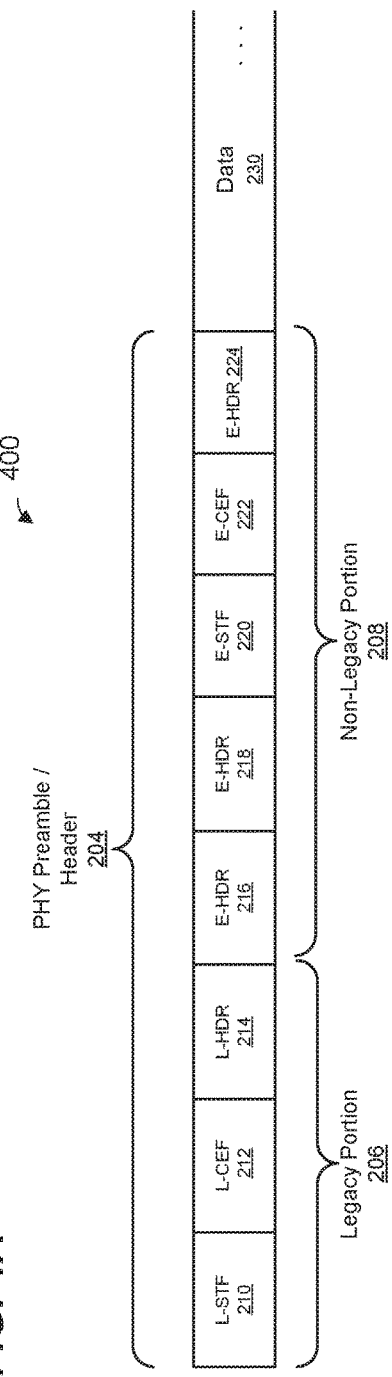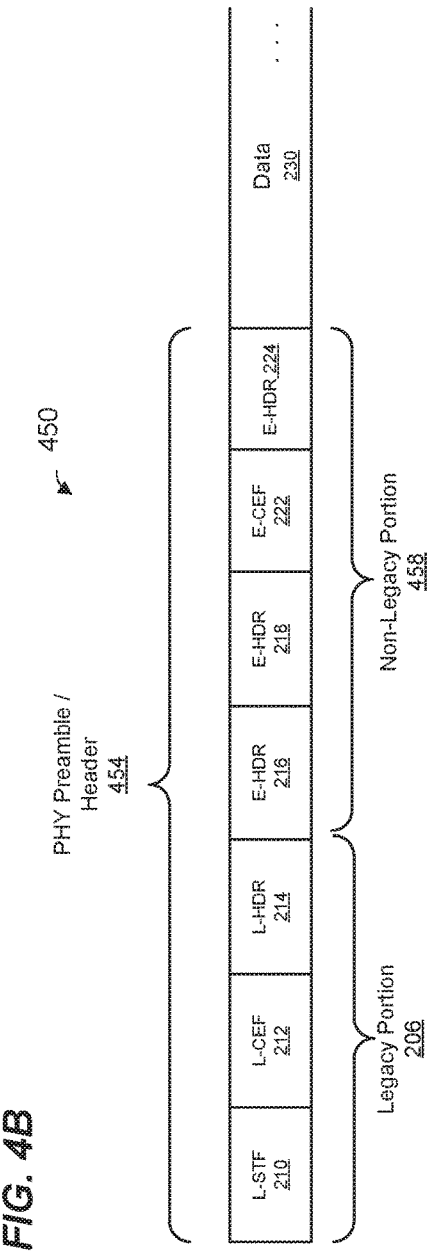

| Scrambler Seed | MCS | Length | Additional PPDU | Pkt Type | Training Length | Aggr | Beam Tracking Req | Tone Paring Type | DTP Indicator | Last RSSI | Turn Around | Rsvd | HCS |
|---|---|---|---|---|---|---|---|---|---|---|---|---|---|

FIG. 5

PHYSICAL LAYER DATA UNIT FORMAT FOR A WIRELESS COMMUNICATION NETWORK

CROSS-REFERENCES TO RELATED APPLICATIONS

This disclosure claims the benefit of U.S. Provisional Patent Application No. 62/205,132, entitled "1 lay PHY Frame Format," filed on Aug. 14, 2015, the disclosure of which is hereby incorporated by reference herein in its entirety.

FIELD OF THE DISCLOSURE

The present disclosure relates generally to communication networks and, more particularly, to wireless local area networks (WLANs) that utilize both single carrier (SC) and orthogonal frequency division multiple access (OFDMA) technologies.

BACKGROUNDS

Wireless local area networks (WLANs) have evolved rapidly over the past decades. WLAN standards such as the Institute for Electrical and Electronics Engineers (IEEE) 802.11a, 802.11g, 802.11n, 802.11ac, and 802.11ad Standards have been developed to specify WLAN operation in various frequency bands and with various peak data throughputs. For example, the IEEE 802.11a and 802.11g Standards specify operation in the 2.4 GHz frequency band with a single-user peak throughput of 54 Mbps, the IEEE 802.11n Standard specifies operation in 2.4 GHz and 5.0 GHz frequency bands with a single-user peak throughput of 600 Mbps, and the IEEE 802.11ac Standard specifies operation in 5.0 GHz frequency band with a single-user peak throughput in the gigabits per second (Gbps) range. The IEEE 802.11ad Standard specifies operation in 60 GHz frequency band with a single-user peak throughput of 7 Gbps. Future standards that will specify operation in various frequency bands promise to provide even greater throughputs, such as throughputs in the tens of Gbps range.

SUMMARY

In an embodiment, a method for generating a data unit for transmission via a communication channel includes determining, at a network interface of a communication device, whether the data unit is to be transmitted using single carrier (SC) modulation or using orthogonal frequency division (OFDM) modulation. The method also includes generating, at the network interface of the communication device, a header field to be included in a preamble of the data unit, including when it is determined that the data unit is to be transmitted using SC modulation, generating the header field using a first technique to indicate one or both of (i) that the data unit conforms to a first communication protocol and not a second communication protocol and (ii) whether the data unit conforms to a first PHY mode of the first communication protocol or a second PHY mode of the first communication protocol, and when it is determined that the data unit is to be transmitted using OFDM modulation, generating the header field using a second technique to indicate one or both of (i) that the data unit conforms to the first communication protocol and not the second communication protocol and (ii) whether the data unit conforms to the first PHY mode of the first communication protocol or the second PHY mode of the first communication protocol. The method additionally includes generating, at the network interface of the communication device, the preamble of the data unit to include at least the header field, and generating, at the network interface of the communication device, the data unit to include at least the preamble.

In another embodiment, a communication device comprises a network interface having one or more integrated circuits configured to determine whether a data unit is to be transmitted using single carrier (SC) modulation or using orthogonal frequency division (OFDM) modulation. The one or more integrated circuits are also configured to generate a header field to be included in a preamble of the data unit, wherein generating the header field includes when it is determined that the data unit is to be transmitted using SC modulation, generating the header field using a first technique to indicate one or both of (i) that the data unit conforms to a first communication protocol and not a second communication protocol and (ii) whether the data unit conforms to a first PHY mode of the first communication protocol or a second PHY mode of the first communication protocol, and when it is determined that the data unit is to be transmitted using OFDM modulation, generating the header field using a second technique to indicate one or both of (i) that the data unit conforms to the first communication protocol and not the second communication protocol and (ii) whether the data unit conforms to the first PHY mode of the first communication protocol or the second PHY mode of the first communication protocol. The one or more integrated circuits are additionally configured to generate the preamble of the data unit to include at least the header field, and generate the data unit to include at least the preamble.

BRIEF DESCRIPTION OF THE DRAWINGS

FIG. 4A is a diagram of an example data unit transmitted using an individual channel, according to an embodiment.

FIG. 4B is a diagram of an example data unit transmitted using an individual channel, according to another embodiment.

FIG. 5 is a diagram of a legacy header field included in a data unit, according to an embodiment.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol.

Similarly, different client stations in the vicinity of the AP may be configured to operate according to different communication protocols. When the AP transmits a data unit according to the first communication protocol, a preamble of the data is formatted such that a client station that operates according to a second communication protocol, and not the first communication protocol, is able to determine certain information regarding the data unit, such as a duration of the data unit, and/or that the data unit does not conform to the second protocol. Additionally, a preamble of the data unit is formatted such that a client station that operates according to the first protocol is able to determine the data unit conforms to the first protocol. Similarly, a client station configured to operate according to the first protocol also transmits data units such as described above.

Data units formatted such as described above may be useful, for example, with an AP that is configured to operate with client stations according to a plurality of different communication protocols and/or with WLANs in which a plurality of client stations operate according to a plurality of different communication protocols. Continuing with the example above, a communication device configured to operate according to both the first communication protocol and the second communication protocol is able to determine that the data unit is formatted according to the first communication protocol and not the second communication protocol. Similarly, a communication device configured to operate according to the second communication protocol but not the first communication protocol is able to determine that the data unit is not formatted according to the second communication protocol and/or to determine a duration of the data unit.

Figure 1:
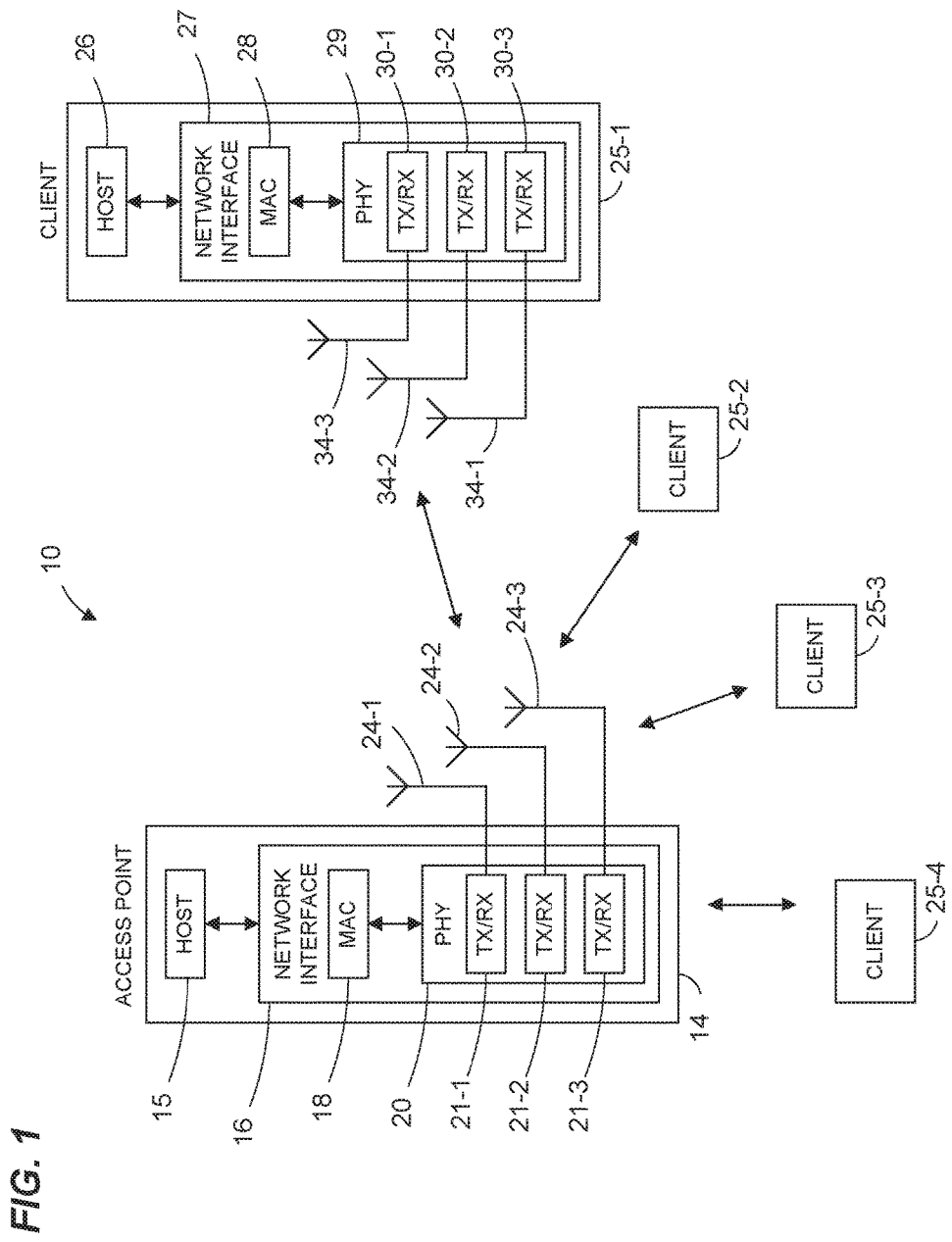
FIG. 1 is a block diagram of an example wireless local area network (WLAN) in which methods and apparatuses described herein are utilized, according to an embodiment.

FIG. 1 is a block diagram of an example wireless local area network (WLAN) 10 in which techniques described below are utilized, according to an embodiment. The WLAN 10 includes an AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the MAC processing unit 18 and the PHY processing unit 20 are configured to operate according to the first communication protocol (e.g., the IEEE 802.11ay Standard). In another embodiment, the MAC unit 18 and the PHY unit 20 are also configured to operate according to a second communication protocol (e.g., the IEEE 802.11ad Standard). In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to a legacy communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In an embodiment, the MAC processing unit 28 and the PHY processing unit 29 are configured to operate according to the first communication protocol (e.g., HE communication protocol). In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to a second, legacy communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

In some embodiments, the first protocol defines individual communication channels of a suitable bandwidth (e.g., 1 MHz, 5 MHz, 10 MHz, 20 MHz, etc.), and composite communication channels can be formed by aggregating or "bonding together" multiple individual channels. For example, in the example of FIG. 2, the data unit 200 spans a composite 40 MHz channel comprising two individual 20 MHz channels, according to an embodiment. In other embodiments, a composite channel can consist of different suitable numbers of individual channels, such as three, four, five, six, seven, etc. In one illustrative embodiment, the first communication protocol permits composite channels consisting of two, four, eight, or sixteen individual communication channels.

Figure 2:
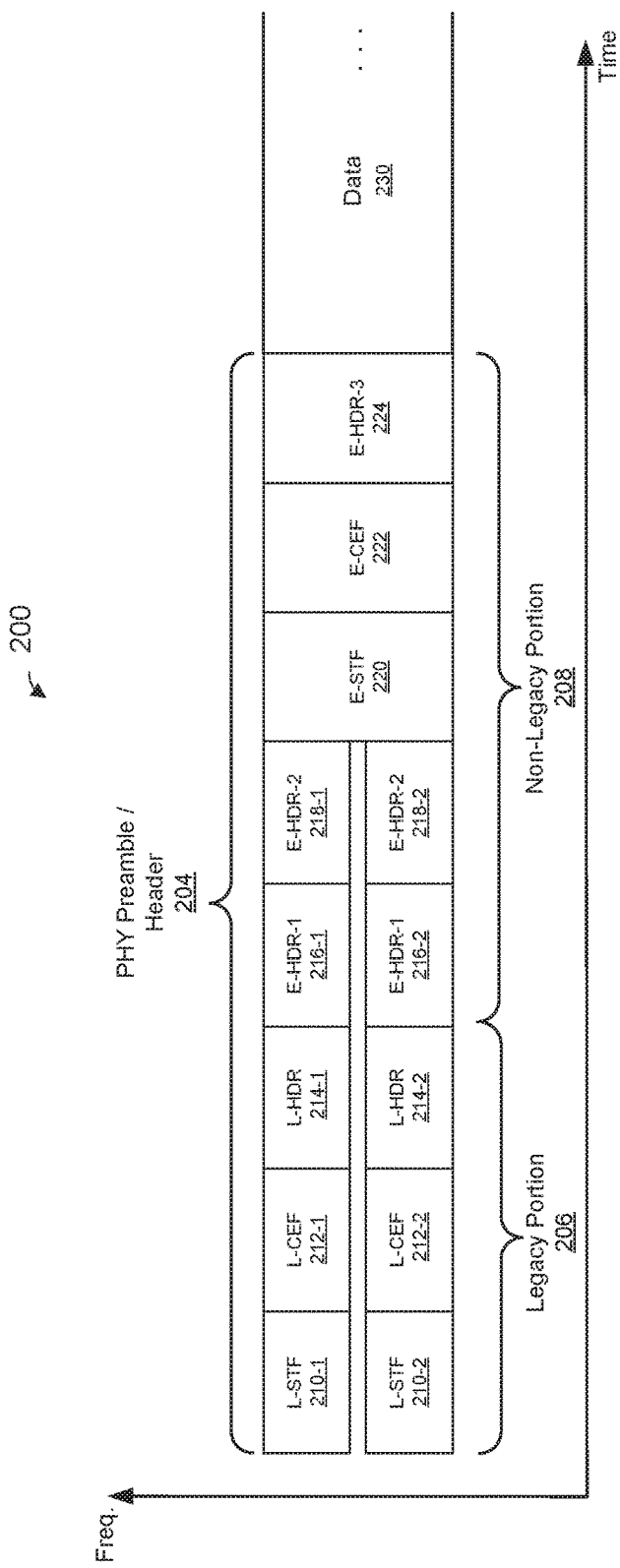
FIG. 2 is a diagram of an example physical layer (PHY) data unit transmitted using channel bonding, according an embodiment.

FIG. 2 is a diagram of a physical layer (PHY) data unit 200 that the AP 14 is configured to transmit to one or more client stations 25 (e.g., one or more of the client stations 25-1, 25-2, 25-3), according to an embodiment. The data unit 200 conforms to the first communication protocol. The data unit 200 is a single carrier (SC) data unit, in an embodiment and/or scenario. The data unit 200 is an orthogonal frequency division multiplexing (OFDM) data unit, in another embodiment and/or scenario. The data unit 200 occupies a 40 MHz bandwidth that includes two individual 20 MHz channels, in an embodiment. Data units similar to the data unit 200 occupy other suitable bandwidths such as 2 MHZ, 10 MHz, 20 MHz, 80 MHz, 120 MHz, 160 MHz, 320 MHz, 640 MHz, etc., for example, or other suitable bandwidths, in other embodiments. The data unit 200 is suitable for "mixed mode" situations, i.e. when the WLAN 10 includes a client station (e.g., the legacy client station 25-4) that conforms to a legacy communication protocol, but not the first communication protocol. The data unit 200 is utilized in other situations as well, in some embodiments.

The data unit 200 includes a preamble 204. The preamble 204 includes a legacy portion 206 and a non-legacy portion 208. The legacy portion 206 includes a legacy short training field (L-STF) 210, a legacy channel estimation field (L-CEF) 212, and a legacy header (L-HDR) 214. The non-legacy portion 208 includes a first extension header (E-HDR-1) field 216, a second extension headers (E-HDR-2) field 218, an extension STF (E-STF) field 220, an extension STF (E-STF) field 222, and a third extension header (E-HDR-3) field 224. In an embodiment, the data unit 200 also includes a data portion 230. In another embodiment, the data unit 200 omits the data portion 230.

In an embodiment, each L-STF 210, L-CEF 212, and L-HDR 214, E-HDR-1 216, and E-HDR-3 218 spans an individual communication channel and is duplicated in other individual communication channels. For example, in an embodiment, L-STF 210, L-CEF 212, and L-HDR 214, E-HDR-1 216, and E-HDR-3 218 spans an individual 20 MHz communication channel and is duplicated in other the individual 20 MHz communication channel. Each of the E-STF 220, E-CEF 222, E-HDR-2 224 and the data portion 230 spans the entire channel bandwidth of the data unit 200, in an embodiment. For example, each of the E-STF 220, E-CEF 222, E-HDR-3 224 and the data portion 230 spans the entire 40 MHz channel bandwidth of the data unit 200, in an embodiment.

In an embodiment, the L-STFs 210, L-CEFs 212, L-HDRs 214, E-HDR-1s 216, and E-HDR-2s 218 are included in an omni-directional portion of the data unit 200. On the other hand, beamforming is applied to at least the data portion 230 of the data unit 200 to steer the data portion 200 in the direction(s) of one or more communication device that are intended recipients of the data unit 200, in an embodiment. I an embodiment, the beamforming is also applied to one or both of the E-STF 220 and the E-HDR-3 224. In another embodiment, the beamforming is not applied to one or both of the E-STF 220 and the E-HDR-3 224.

In embodiments in which the data unit 200 spans only a single individual channel, the data unit includes a single one of each of L-STF 210, L-CEF 212, and L-HDR 214, E-HDR-1 216, and E-HDR-2 218.

The L-STF 210 is generally used for signal acquisition at a receiving device, in an embodiment. For example, the L-STF 210 is used at the receiving device for tasks and procedures related to carrier sensing, timing, auto gain control (AGC) setting, carrier frequency offset (CFO) acquisition and tracking, frame timing, etc. The L-CEF 212 is generally used for channel estimation and CFO fine tuning, in an embodiment. The L-CEF 212 is also used for transmission mode identification, in an embodiment. For example, L-CEF 212, the L-CEF 212 is generated differently depending on whether the data unit 200 is a single carrier data unit or an OFDM data unit to allow a receiver device to auto-detect whether single carrier modulation or OFDM modulation is being used for transmission of the data unit 200, in an embodiment.

Figure 3:
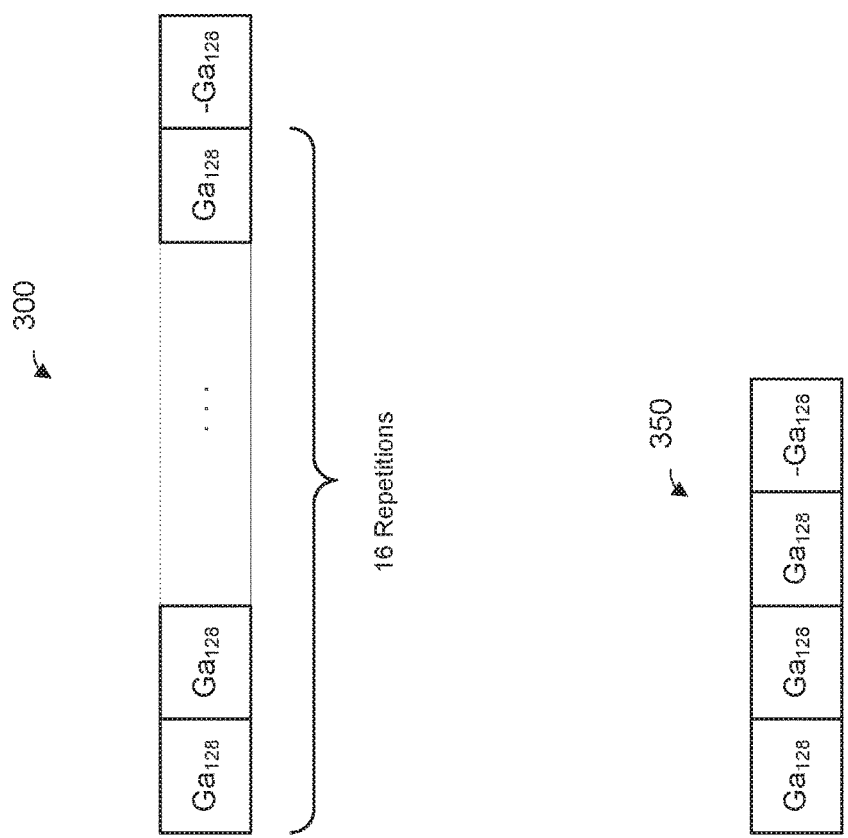
FIG. 3 is a diagram of several example short training fields included in a data unit, according to an embodiment.

The E-STF 220 is used for adjustment of AGC and fine tuning of timing acquired based on the L-STF 210, in an embodiment. In an embodiment, the E-STF 220 is shorter (e.g., 25% shorter, 50% shorter, 75% shorter, etc.) than the L-STF 210. In an embodiment, the E-STF 220 is generally the same as the L-STF 210 except that the E-STF 220 is shorter than L-STF 210. Referring, for example, to FIG. 3, an STF 300 corresponds to the L-STF 210 of the data unit 200 and an STF 350 corresponds to the E-STF 220 of the data unit 200, in an embodiment. The STF 300 includes 16 repetitions of a 128-bit Golay sequence (Ga128) followed by a flipped 128-bit Golay sequence (negative Ga128), in the illustrated embodiment. On the other hand, the STF 350 includes three repetitions of the 128-bit Golay sequence (Ga128) followed by a flipped 128-bit Golay sequence (negative Ga128), in the illustrated embodiment.

Referring again to FIG. 2, in another embodiment, the E-STF 220 has the same length as the L-STF 210.

With continued reference to FIG. 2, the E-CEF 222 of the data unit 200 includes one or more symbols that may be used by a receiving device to obtain channel estimates corresponding to multiple spatial streams used to transmit the data unit 200 in a multiple input multiple output (MIMO) configuration. In an embodiment, the number of symbols in the E-CEF 222 depends on the number of spatial streams used to transmit the data unit 200. Each symbol of the E-CEF 222 has the same length as the L-CEF 212, in an embodiment. In another embodiment, each symbol of the E-CEF is longer (e.g., 25% shorter, 50% shorter, 75% longer, etc.) than or shorter (e.g., 25% shorter, 50% shorter, 75% shorter, etc.) than the L-CEF 212.

The L-HDR 214 is used for PHY signaling as generally defined by the legacy communication protocol, in an embodiment. The E-HDR-1 216, E-HDR-2 218 and E-HDR-3 224 generally include "extended signaling" to signal PHY parameters and configurations that are supported by the first communication protocol but are not supported by the legacy communication protocol, in an embodiment. In some embodiments, the data unit 200 omits one of E-HDR-2 218 and E-HDR-3 224. In this case, extended signaling defined by the first communication protocol is distributed among the E-HDR-1 216 and the other one of the E-HDR-2 218 and E-HDR-3 224, in an embodiment. In another embodiment, the data unit 200 omits both E-HDR-2 218 and E-HDR-3 224. In this case, all of the extended signaling defined by the first communication protocol is included in E-HDR-1 21, in an embodiment.

In an embodiment, each of the L-STFs 210 and each of the L-CEFs 212 has a format as specified in the legacy communication protocol. In an embodiment, each of the L-HDRs 214 has a format at least substantially as specified in the IEEE 802.11ad Standard. In some embodiments, some bits or fields of the L-HDR 214 are used for different purposes than the purpose of corresponding bits or fields defined by the legacy communication protocol. For example, some bits in L-HDR 214 that are defined as reserved bits by the legacy communication protocol are instead used for signaling in the first communication protocol, in an embodiment. As another example, some fields in L-HDR 214 are redefined by the first communication protocol to have different meanings than the corresponding fields according to the legacy communication protocol.

FIG. 4A is a diagram of a PHY data unit 400 that the AP 14 is configured to transmit to one or more client stations 25 (e.g., one or more of the client stations 25-1, 25-2, 25-3), according to an embodiment. The data unit 400 conforms to the first communication protocol, in an embodiment. The data unit 400 occupies an individual channel of the WLAN 10, in an embodiment. For example, the data unit 400 occupies a 20 MHz bandwidth, in an embodiment. The data unit 400 occupies other suitable individual channel bandwidths, such as 1 MHz, 10 MHz, 40 MHz, for example, or other bandwidths, in other embodiments. The data unit 400 is suitable for mixed mode situations. The data unit 400 is utilized in other situations as well, in some embodiments.

The data unit 400 is generally the same as the data unit 200 of FIG. 2 except that the data unit 400 does not include a duplicated preamble/header portion, in an embodiment. The data unit 400 is suitable for use in an embodiment in which the first communication protocol does not support channel bonding. The data unit 400 is also suitable for use in an embodiment in which the first communication channel supports channel bonding, but the data unit 400 is being transmitted in an individual channel PHY mode using only one individual communication channel and without using channel bonding.

FIG. 4B is a diagram of a PHY data unit 450 that the AP 14 is configured to transmit to one or more client stations 25 (e.g., one or more of the client stations 25-1, 25-2, 25-3), according to an embodiment. The data unit 450 conforms to the first communication protocol, in an embodiment. The data unit 450 occupies an individual communication channel. For example, the data unit 450 occupies a 20 MHz bandwidth, in an embodiment. The data unit 450 occupies other suitable individual channel bandwidths, such as 1 MHz, 10 MHz, 40 MHz, for example, or other suitable individual channel bandwidths, in other embodiments. The data unit 450 is suitable for mixed mode situations. The data unit 450 is utilized in other situations as well, in some embodiments.

The data unit 450 is generally the same as the data unit 400 of FIG. 4A except that the data unit 450 includes a preamble 454 in which a non-legacy portion 458 omits the E-STF 222. In an embodiment in which the first communication protocol supports channel bonding, the data unit 200 of FIG. 2 corresponds to a bonded channel PHY mode that utilizes channel bonding, and the data unit 450 corresponds to an individual channel PHY mode that does not utilize channel bonding. For example, in an embodiment, when a data unit, such as the data unit 200, that conforms to the first communication protocol is transmitted in a bonded channel PHY mode that utilizes channel bonding, then the data unit includes an E-STF such as the E-STF 220. On the other hand, if the data unit is transmitted in an individual channel PHY mode that does not utilize channel bonding, then the data unit omits an E-STF such as the E-STF 220, in an embodiment.

Referring back to FIG. 2, in an embodiment in which the data unit 200 is transmitted in the bonded channel PHY mode, as each symbol of E-CEF 222 is generated, a separate column of a matrix P is used to map the values to spatial streams. In an embodiment, the matrix P defined in the IEEE 802.11ac Standard is used. In another embodiment, another suitable mapping matrix P is used. In an embodiment, the first column of the matrix P, i.e., $P_1$, is applied to the first symbol of the E-CEF 222, the second column of the matrix P, i.e., $P_2$, is applied to the first symbol of the E-CEF 222, etc., in an embodiment. Similarly, referring now to FIG. 4A, in an embodiment in which the data unit 400 is transmitted in the individual channel PHY mode and where the individual channel PHY mode does not omit the E-STF 220, the first column of the matrix P, i.e., $P_1$, is applied to the first symbol of the E-CEF 222, the second column of the matrix P, i.e., $P_2$, is applied to the first symbol of the E-CEF 222, etc., in an embodiment.

Referring now to FIG. 4B, in an embodiment in which the data unit 450 is transmitted in the individual channel PHY mode and where the individual channel PHY mode omits the E-STF 220, the first column of the matrix P is applied to the L-CEF 212, the second column of the matrix P is applied to the first symbol of the E-CEF 222, the third column of the matrix P is applied to the second symbol of the E-CEF 222, and so on, in an embodiment. Alternatively, in another embodiment in which the data unit 450 is transmitted in the individual channel PHY mode and where the individual channel PHY mode omits the E-STF 220, the matrix P is applied to the symbols of the E-CEF 222 in the same manner as in the bonded channel PHY mode as described above. Accordingly, the first column of the matrix P, i.e., $P_1$, is applied to the first symbol of the E-CEF 222 of a data unit regardless of whether the E-CEF 222 is included in the data unit or is omitted from the data unit, in this embodiment.

FIG. 5 is a diagram of a legacy header field 500, according to an embodiment. The legacy header field 500 corresponds to the L-HDR 214 of the data unit 200 of FIG. 2, in an embodiment. In another embodiment, the legacy header field 500 is included in a data unit different from the data unit 200 of FIG. 2. For ease of explanation, the legacy header field 500 is described with reference to the data unit 200 of FIG. 2. The legacy header field 500 includes a plurality of subfields 502, including a scrambler seed subfield 502-1, a modulation and coding (MCS) subfield 502-2, a length subfield 502-3, an additional PPDU subfield 502-2, a packet type subfield 502-5, a aggregation subfield 502-6, a beam tracking request subfield 502-7, a tone pairing type subfield 502-7, a dynamic tone pairing (DTP) indicator subfield 502-8, a last received signal indicator (RSSI) subfield 502-9, a turnaround subfield 502-10, reserved bits 502-11, and a header check sequence HCS subfield 502-12.

In an embodiment, the MCS subfield 502-2 and the length 502-3 in the legacy header field 500 are set to indicate the duration T corresponding to remainder of the data the data unit 200 after the legacy portion 206. This permits client devices that are not configured according to the first communication protocol to determine an end of the data unit 200, for carrier sense multiple access/collision avoidance (CSMA/CA) purposes, for example. For instance, a legacy client device configured according to the IEEE 802.11ad Standard will detect a data error from E-HDR-1 field 216, according to the receiver state machine specified in the IEEE 802.11ad Standard. Further according to the IEEE 802.11ad Standard, the legacy client device will compute a packet duration (T) based on the MCS subfield 502-2 and the length subfield 502-3, and will wait until the end of the computed packet duration T before performing clear channel assessment (CCA).

In an embodiment, to indicate the duration T corresponding to remainder of the data the data unit 200 after the legacy portion 206, a transmitting device sets the MCS subfield 502-2 to indicate a predetermined MCS, such as a lowest MCS defined by the legacy communication protocol (e.g., MCS0). Additionally, the transmitting device sets the length field 502-3 to a length value determined based on the predetermined MCS such that a duration competed based on the predetermined MCS indicated by the subfield 502-2 (e.g., MCS0) and the value of the length subfield 502-3 will cover the duration T corresponding to remainder of the data the data unit 200 after the legacy portion 206, in this embodiment. In another embodiment, the transmitting device selects any suitable MCS, and sets the MCS subfield 502-2 to indicate the selected MCS. Additionally, the transmitting device sets the length field 502-3 to a length value determined based on the selected MCS such that a duration competed based on the selected MCS indicated by the subfield 502-2 (e.g., MCS0) and the value of the length subfield 502-3 will cover the duration T corresponding to remainder of the data the data unit 200 after the legacy portion 206, in this embodiment.

With continued reference to FIG. 5, in an embodiment, the reserved bits 502-11 include two reserved bits. In another embodiment, the reserved bits 502-11 include four reserved bits. In other embodiments, the reserved bits 502-11 include other suitable numbers (e.g., 1, 3, 5, 6, 7, 8, etc.) of reserved bits. In an embodiment, the reserved bits 502-11 are set to a value different from the value specified for the reserved bits by the legacy communication protocol. For example, the reserved bits 502-11 are set to a non-zero value, whereas the legacy communication protocols specifies that the reserved bits 502-11 are set to logic zeros. In an embodiment, the reserved bits 502-11 are set to a non-zero value to indicate to devices that conform to the first communication protocol that the data unit 200 conforms to the first communication protocol, for example. In another embodiment, the reserved bits 502-11 are set to a first non-zero value to indicate to devices that conform to the first communication protocol that the data unit 200 (i) conforms to the first communication protocol and (ii) is transmitted in a first PHY mode in which the preamble 204 includes an E-CEF field (e.g., the bonded channel PHY mode), and are set to a second non-zero value to indicate to devices that conform to the first communication protocol that the data unit 200 (i) conforms to the first communication protocol and (ii) is transmitted in a second PHY mode in which the preamble 204 excludes the E-CEF field (e.g., the individual channel PHY mode). As yet another example, in another embodiment, the reserved bits 502-11 are set to a non-zero value to indicate to devices that conform to the first communication protocol that the data unit 200 conforms to the first communication protocol and to further indicate a bandwidth of the data unit 200. In other embodiments, the reserved bits 502-11 are set to additionally or alternatively indicate other parameters of the data unit 200. In some embodiments, the reserved bits 502-11 are set to all zeros as specified by the legacy communication protocol.

Figure 6:
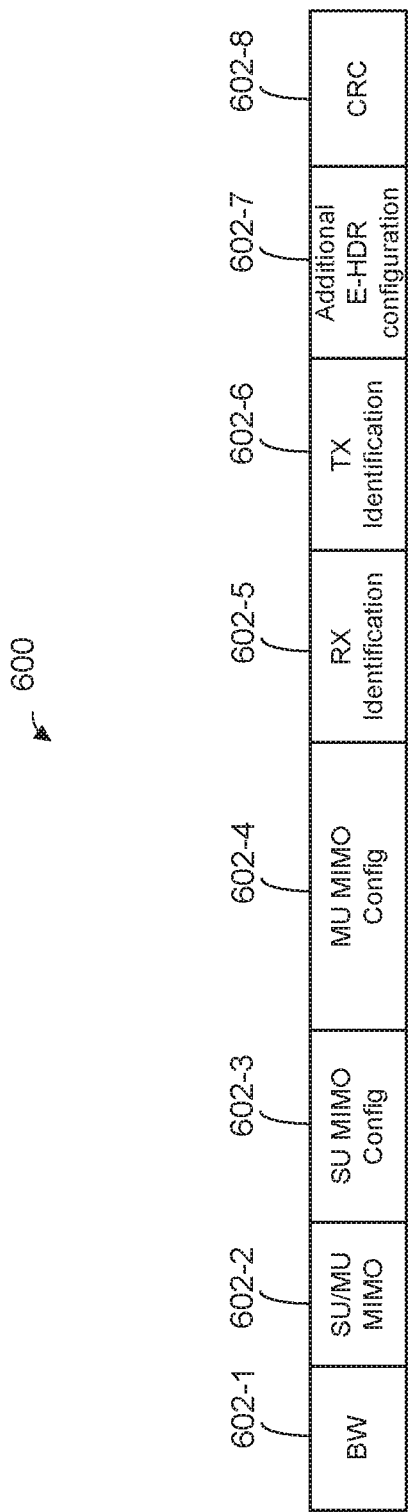
FIG. 6 is a diagram of example subfields included in an extended header field of a data unit, according to an embodiment.

FIG. 6 is a diagram illustrating example subfields 602 included in one or more extended header fields of a data unit, according to an embodiment. For example, the extended header subfields 602 are included in the E-HDR-1 field 216 of the data unit 200 of FIG. 2, in an embodiment. For ease of explanation, the subfields are described with reference to the E-HDR-1 field 216 and the data unit 200. However, at least some of the subfields 602 are included E-HDR-2 field 218 or the E-HDR-2 field 228 of the data unit 200, in some embodiment. Further, the subfields 602 are included in extended header fields of data units different from the data unit 200 of FIG. 2, in some embodiments.

The subfields 602 include a bandwidths field 602-2, an single user/multi-user (SU/MU-) MIMO indication field 602-2, an SU MIMO configuration field 602-3, an MU MIMO configuration field 602-4, a receiver (RX) indication field 602-5, a transmitter (TX) indication 602-6, additional E-HDR configuration subfield fields 602-7, and a cyclic redundancy check (CRC) field 602-8. The BW subfield 602-2 indicates a bandwidth of the data unit 200. In some embodiments, the bandwidth subfield 602-2 additionally indicates channel configuration being used for transmission of the data unit 200. The SU/MU MIMO subfield 602-4 indicates whether the data unit 200 is a single user data unit that includes a single data stream for only one receiver (e.g., a single client station 25), or a multi-user data unit that includes respective data streams for multiple receivers (e.g., multiple client stations 25). The SU-MIMO configuration subfield 602-3 indicates transmission parameters, such as, for example, one or both of (i) MCS and (ii) number of spatial streams used for transmission of data to the one client station that is the intended recipient of the data unit 200. The MU-MIMO configuration subfield 602-4 includes respective indications of transmission of data to multiple client stations, in an embodiment. For example, the MU-MIMO configuration subfield 602-4 includes respective indications of one or both of (i) MCS and (ii) number of spatial streams used for transmission of data to each of the multiple client stations that are the intended recipients of the data unit 200.

The Rx identification subfield 602-5 includes one or more identifiers of one or multiple intended recipients of the data unit 200, in an embodiment. For example, when the data unit 200 is a single user data unit, the Rx identification subfield 602-5 includes an identifier of the single client station that is the intended recipient of the data unit 200, in an embodiment. The identifier of the single client station includes an association identifier (AID) corresponding to the client station or a partial association identifier (PAID), for example, in various embodiments. As another example, when the data unit 200 is a multi-user data, the Rx identification subfield 602-5 includes respective identifiers (e.g., AIDs or PAIDs) of the client stations that are intended recipients of the data unit 200, or a group identifier (GID) associated with a group of multiple client stations that are the intended recipients of the data 200, in various embodiments.

The Tx identification subfield 602-6 includes an identifier of the device (e.g., the AP 14) that is transmitting the data unit 200. For example, the Tx identification subfield 602-6 includes a BSS color, or another suitable BSS identifier, corresponding to the BSS associated with the AP that is transmitting the data unit 200. The additional E-HDR configuration subfield 602-7 includes configuration information corresponding to the E-HDR-2 field 218 and/or E-HDR-3 field 224, in an embodiment. For example, the additional E-HDR configuration subfield 602-7 indicates a length of the E-HDR-2 field 218 and/or a length of the E-HDR-3 field 224, in an embodiment. As another example, the additional E-HDR configuration subfield 602-7 indicates a modulation and coding scheme used for transmission of the E-HDR-2 field 218 and/or a modulation and coding scheme used for transmission of the E-HDR-3 field 224, in an embodiment. The CRC subfield 602-7 includes cyclic redundancy check bits that allow the receiving device to check correctness of the subfields 602, in an embodiment.

In some embodiments, one or more of the subfields 602-5 are omitted from the E-HDR field 216. For example, in an embodiment in which the bandwidth of the data unit 200 is signaled in the L-HDR 214, the BW subfield 602-1 is omitted from the E-HDR field 216, in an embodiment. As another example, the SU-MIMO configuration subfield 602-3 is included in the E-HDR-1 field 216 when the data unit 200 is a single user mode data unit, and is omitted from the E-HDR-1 field 216 when the data unit is a multi-user data unit, in an embodiment. Similarly, the MU-MIMO configuration subfield 602-4 is included in the extended header fields of the data unit 200 when the data unit 200 is a single mode data unit, and is omitted from the extended header fields of the data unit 200 when the data unit is a single user data unit, in an embodiment. In some embodiments, one or more additional subfields not illustrated in FIG. 6 are included in the E-HDR field 216.

In some embodiments, the E-HDR-1 field 216 is formatted, encoded and/or modulated differently from the L-HDR 214. In an embodiment, the E-HDR-1 field 216 is formatted such that a receiving device can auto-detect based on the E-HDR-1 field 216 that the data unit 200 conforms to the first communication protocol and not the second communication protocol. Additionally or alternatively, the E-HDR-1 field 216 is formatted such that a receiving device can auto-detect based on the E-HDR-1 field 216 whether the preamble 204 of the data unit 200 corresponds to a first PHY mode of the first communication protocol or a second PHY mode of the first communication protocol, in an embodiment. For example, the E-HDR-1 field 216 is formatted such that a receiving device can auto-detect based on the E-HDR-1 field 216 whether the preamble 204 of the data unit 200 corresponds to the bonded channel PHY mode in which the preamble 204 includes the E-STF 220 or the individual channel PHY mode in which the preamble 204 omits the E-STF 220, in an embodiment.

The particular technique used for indicating one or both of (i) that a data unit conforms to the first communication protocol and (ii) whether the data unit conforms to a first PHY mode (e.g., the bonded channel PHY mode) or a second PHY mode (e.g., the individual channel PHY mode) of the first communication protocol depends on whether the data unit is a single carrier data unit or an OFDM data unit, in an embodiment. For example, in an embodiment, when a data unit is a single carrier data unit, the E-HDR-1 field 216 of the data unit is generated using a first technique to indicate one or both of (i) that the data unit conforms to a first communication protocol and not a second communication protocol and (ii) whether the data unit conforms to a first PHY mode of the first communication protocol or a second PHY mode of the first communication protocol. On the other hand, when a data unit is an OFDM data unit, the E-HDR-1 field 216 of the data unit is generated using a second technique to indicate one or both of (i) that the data unit conforms to a first communication protocol and not a second communication protocol and (ii) whether the data unit conforms to a first PHY mode of the first communication protocol or a second PHY mode of the first communication protocol, in an embodiment.

Figure 7A:
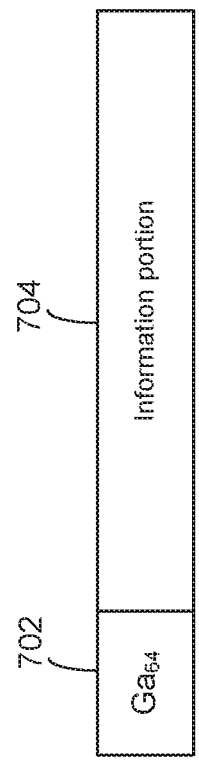
FIGS. 7A-7B are diagrams of modulation blocks of different header fields of a single carrier data unit, according an embodiment.

FIG. 7A is a diagram of a modulation block 700 of the L-HDR field 214 of a single carrier data unit, according to an embodiment. The modulation block 700 of the L-HDR field 214 is formatted as defined by the legacy communication protocol, according an embodiment. The modulation block 700 includes a guard interval 702 and an information portion 704. The guard interval 702 includes a first sequence, in an embodiment. The first sequence is a Golay sequence, such as a Ga64 sequence, in an embodiment.

Figure 7B:
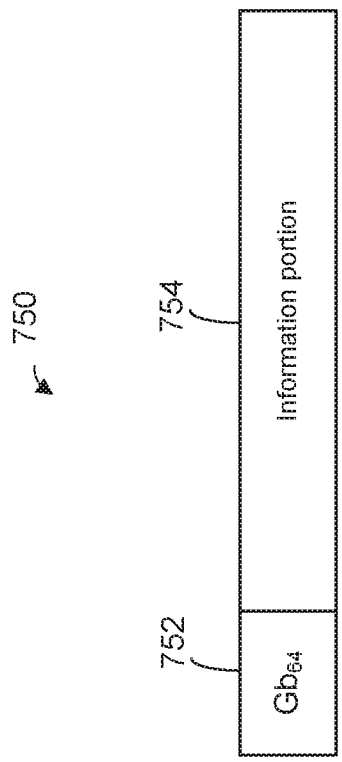

Referring now to FIG. 7B, one or more modulation blocks such as a modulation block 750 are included in the E-HDR-1 field 216 of a single carrier data unit, in an embodiment. The modulation block 750 is generally the same as the modulation block 700 of FIG. 7A, except that a guard interval 752 of the modulation block 750 includes a second sequence that is different from the first sequence included in the guard interval 702 of the modulation block 700, in an embodiment. In an embodiment, whereas the guard interval 702 of the modulation symbol 700 includes a first Golay sequence, the guard interval 752 of the modulation block 750 includes a second Golay sequence that has a suitably low correlation with the first Golay sequence. For example, in an embodiment, whereas the first Golay sequence is the Ga64 sequence, the second Golay sequence is the Gb64 sequence or another suitable 64-bit Golay sequence that has low correlation with the Ga64 sequence.

In an embodiment, a communication device that receives a data unit determines whether the data unit conforms to the first communication protocol based on a result of autocorrelation of a modulation block included in the E-HDR-1 field 216 of the data unit with the first sequence or with the second sequence. For example, in an embodiment in which auto-correlation with the second sequence is performed, the communication device determines that the data unit conforms to the first communication protocol if auto-correlation result indicates low correlation with the first sequence. On the other hand, in an embodiment in which auto-correlation with the second sequence is performed, the communication device determines that the data unit conforms to the first communication protocol if auto-correlation result indicates high correlation with the second sequence.

In another embodiment, a communication device that receives a data unit determines, based on a result of auto-correlation of a modulation block included in the E-HDR-1 field 216 of the data unit with the first sequence and/or the second sequence, whether the preamble 204 of the data unit corresponds to a first PHY mode (e.g., the bonded channel PHY mode) in which the preamble 204 includes the E-STF 220 or a second PHY mode (e.g., the individual channel PHY mode) in which the preamble 204 omits the E-STF 220. For example, a high auto-correlation with the first sequence indicates that the preamble 204 of the data unit 200 corresponds to the bonded channel PHY mode, in an embodiment. On the other hand, a high auto-correlation with the second sequence indicates that the preamble 204 of the data unit corresponds to the individual channel PHY mode, or vice versa, in an embodiment.

With continued reference to FIGS. 7A-7B, in an embodiment, modulation of the information portion 704 of the modulation block 700 is different from modulation of the information portion 754 of the modulation block 750, in an embodiment. For example, modulation of the information portion 754 is rotated by 90 degrees, or is rotated by −90 degrees, relative to modulation of the information portion 704, in some embodiments. Thus, for example, in an embodiment, whereas the information portion 704 includes a plurality of BPSK modulation symbols, the information portion 754 includes a plurality of BPSK modulation symbols rotated by 90 degrees, or is rotated by −90 degrees, in an embodiment. In an embodiment, a communication device that receives a data unit determines, based on detecting a modulation of an information portion of a modulation block in the E-HDR-1 field 216 of the data unit, that the data unit conforms to the first communication protocol. In another embodiment, a communication device that receives a data unit determines, based on detecting a modulation of an information portion of a modulation block in the E-HDR-1 field 216 of the data unit, whether the preamble 204 of the data unit corresponds to a first PHY mode (e.g., the bonded channel PHY mode) or a second PHY mode (e.g., the individual channel PHY mode) of the first communication protocol.

In some embodiments, a communication device that receives a data unit utilizes the sequence included in the guard interval of a modulation block included in the E-HDR-1 field 216 as described above to determine a first one of (i) that the data unit corresponds to the first communication protocol and (ii) whether the preamble 204 of the data unit corresponds to a first PHY mode (e.g., the bonded channel PHY mode) or a second PHY mode (e.g., the individual channel PHY mode) of the first communication protocol, and utilizes the modulation of the information portion of the modulation block included in the E-HDR-1 field 216 as described above to determine the other one of (i) that the data unit corresponds to the first communication protocol and (ii) whether the preamble 204 of the data unit corresponds to a first PHY mode (e.g., the bonded channel PHY mode) or a second PHY mode (e.g., the individual channel PHY mode) of the first communication protocol.

As discussed above, in an embodiment, when a data unit is an OFDM data unit, the E-HDR-1 field 216 of the data unit is generated using a second technique to indicate one or both of (i) that the data unit conforms to a first communication protocol and not a second communication protocol and (ii) whether the data unit conforms to a first PHY mode of the first communication protocol or a second PHY mode of the first communication protocol, in an embodiment. In an embodiment, according to the second technique, signs of one or more of pilot tones in an OFDM symbol of the E-HDR-1 field 216 are flipped with respect to corresponding pilot tone signs defined by the legacy communication protocol. Additionally or alternatively, signs of repeated encoded blocks of the E-HDR-1 field 216 are flipped with respect to signs of the corresponding encoded blocks defined by the second communication protocol, in an embodiment. For example, according to the legacy communication protocol, information bits to be included in the L-HDR field 214 are encoded using block encoding, such as low density parity check (LDPC) encoding, and a block corresponding to a codeword is repeated an integer number (e.g., 2, 3, 4, 5, 6) of times. For example, according to the legacy communication protocol, a block corresponding to a codeword C in a header is repeated three times resulting in block sequence {C1, C2, C3}, in an embodiment. A similar block repetition is used in the E-HDR-1 field 216 of the data unit 200, except that signs of encoded bits are flipped in some of the blocks, in an embodiment. For example, signs in the second block C2 and the third block C3 are flipped resulting in the block sequence {C1, −C2, −C3} in an embodiment. As another example, signs of even encoded bits (i.e., bits 2, 4, 6, 8, etc.) are flipped in the second block C2, and signs of odd encoded bits (i.e., bits 1, 3, 5, 7, etc.) are flipped in the third block C3, or vice versa, in an embodiment.

In various embodiments, when a communication device receives a data unit and determines that the data unit is an OFDM data unit, the communication device utilizes signs of pilot tones in an OFDM symbol corresponding to the E-HDR-1 field 216 of the data unit and/or sings of encoded bits in repeated blocks of the E-HDR-1 field 216 of the data unit to determine one or both of (i) that the data unit corresponds to the first communication protocol and (ii) whether the preamble 204 of the data unit corresponds to a first PHY mode (e.g., the bonded channel PHY mode) or a second PHY mode (e.g., the individual channel PHY mode) of the first communication protocol.

Figure 8:
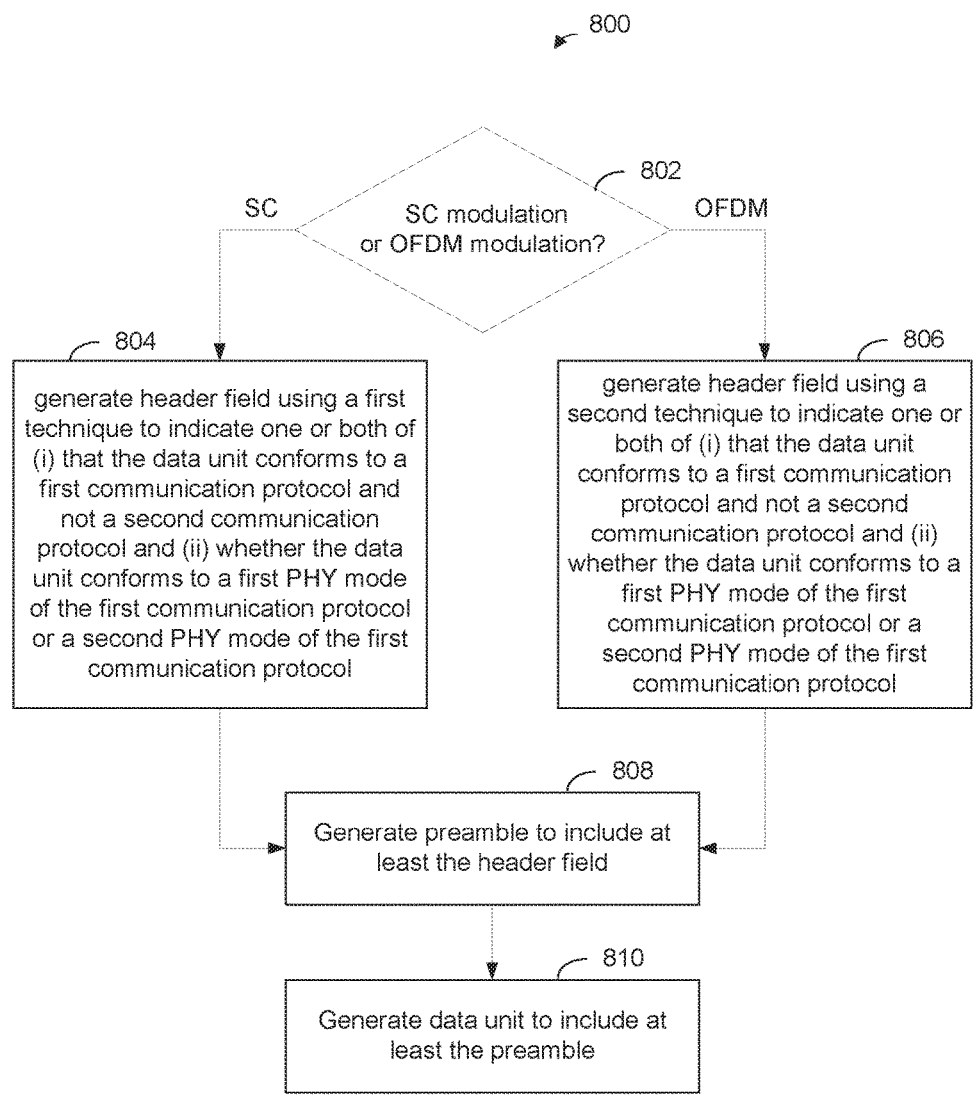
FIG. 8 is a flow diagram of an example method for generating a data unit for transmission in a communication channel, according to an embodiment.

FIG. 8 is a flow diagram of an example method 800 for generating a data unit for transmission in a communication channel, according to an embodiment. With reference to FIG. 1, the method 800 is implemented by the network interface device 16, in an embodiment. For example, in one such embodiment, the PHY processing unit 20 is configured to implement at least a portion of the method 800. According to another embodiment, the MAC processing 18 is also configured to implement at least a portion of the method 800. With continued reference to FIG. 1, in yet another embodiment, the method 800 is implemented by the network interface device 27 (e.g., the PHY processing unit 29 and/or the MAC processing unit 28). In other embodiments, the method 800 is implemented by other suitable network interface devices.

At block 802, it is determined whether the data unit is to be transmitted using SC modulation or OFDM modulation. If it is determined at block 802 that the data unit is to be transmitted using SC modulation, then block 804 is performed. At block 804, a header field of a preamble of the data unit is generating using a first technique to indicate one or both of (i) that the data unit conforms to a first communication protocol and not a second communication protocol and (ii) whether the data unit conforms to a first PHY mode of the first communication protocol or a second PHY mode of the first communication protocol. The first technique includes generating a modulation block of the header to include a first guard interval sequence or a second guard interval sequence and/or rotating modulation of the header field, as described above, in an embodiment. In another embodiment, another suitable first technique is used.

Returning to block 802, if it determined that the data unit is to be transmitted using OFDM modulation, then block 806 is performed. At block 806, a header field of a preamble of the data unit is generating using a second technique to indicate one or both of (i) that the data unit conforms to the first communication protocol and not the second communication protocol and (ii) whether the data unit conforms to the first PHY mode of the first communication protocol or the second PHY mode of the first communication protocol. The second technique includes flipping signs of pilot tones of an OFDM symbol of the header and/or flipping signs of repeated code blocks of the header, as described above, in an embodiment. In another embodiment, another suitable first technique is used.

At block 808, a preamble of the data unit is generated to include at least the header generated at block 804 or at block 806. At block 810, the data unit is generated the data unit is generated to include at least the preamble. In an embodiment, one of the data unit 200 of FIG. 2, the data unit 400 of FIG. 4A or the data unit 450 of FIG. 4B is generated. In another embodiment, another suitable data unit is generated. In an embodiment, the data unit is generated to further include a data portion. The data portion is modulated using single carrier modulation of OFDM modulation according to the determination at block 802, in an embodiment.

In an embodiment, a method for generating a data unit for transmission via a communication channel includes determining, at a network interface of a communication device, whether the data unit is to be transmitted using single carrier (SC) modulation or using orthogonal frequency division (OFDM) modulation. The method also includes generating, at the network interface of the communication device, a header field to be included in a preamble of the data unit, including when it is determined that the data unit is to be transmitted using SC modulation, generating the header field using a first technique to indicate one or both of (i) that the data unit conforms to a first communication protocol and not a second communication protocol and (ii) whether the data unit conforms to a first PHY mode of the first communication protocol or a second PHY mode of the first communication protocol, and when it is determined that the data unit is to be transmitted using OFDM modulation, generating the header field using a second technique to indicate one or both of (i) that the data unit conforms to the first communication protocol and not the second communication protocol and (ii) whether the data unit conforms to the first PHY mode of the first communication protocol or the second PHY mode of the first communication protocol. The method additionally includes generating, at the network interface of the communication device, the preamble of the data unit to include at least the header field, and generating, at the network interface of the communication device, the data unit to include at least the preamble.

In other embodiments, the method includes any suitable combination of one or more of the following features.

When it is determined that the data unit is to be transmitted using SC modulation, generating the header includes generating a modulation block of the header field to include an information portion and a guard interval.

The second communication protocol specifies a first guard interval sequence, and generating the header includes setting the guard interval to a second guard interval sequence.

The second guard interval sequence has a low correlation with the first guard interval sequence.

Generating the header field includes modulating the information portion using a modulation that is rotated with respect to modulation specified for a corresponding field by the second communication protocol.

When it is determined that the data unit is to be transmitted using OFDM modulation, generating the header field includes generating at least one OFDM symbol that includes one or more pilot tones The one or more pilot tones are set to values that have flipped signs with respect to value specified for corresponding pilot tones by the second communication protocol.

When it is determined that the data unit is to be transmitted using OFDM modulation, generating the header field includes generating two or more repetitions of encoded information bits to be included in the header field.

Generating the two or more repetitions includes flipping signs of at least some of the information bits in a first one of the two or more repetitions with respect to signs of the corresponding information bits in a second one of the two or more repetitions.

The first PHY mode is a bonded channel PHY mode that utilizes channel bonding and the second PHY mode is an individual channel PHY mode that does not utilize channel bonding.

Generating the preamble of the data unit further comprises including at least a first short training field in the preamble of the data unit.

When the data unit conforms to the first PHY mode, generating the preamble includes further including a second short training field in the preamble of the data unit.

When the data unit conforms to the second PHY mode, generating the preamble includes omitting the second short training field from the preamble of the data unit.

The second header field is a non-legacy header field that conforms to the first communication protocol.

The method further comprises generating, at the network interface of the communication device, a legacy header field that conforms to the second communication protocol.

Generating the preamble of the data unit comprises generating the preamble to further include the legacy header field.

Generating the legacy header includes generating the legacy header field to include information that indicates a duration of the data unit such that a legacy receiver device that conforms to the second communication protocol but does not conform to the first communication protocol can determine a duration of the data unit.

In another embodiment, a communication device comprises a network interface having one or more integrated circuits configured to determine whether a data unit is to be transmitted using single carrier (SC) modulation or using orthogonal frequency division (OFDM) modulation. The one or more integrated circuits are also configured to generate a header field to be included in a preamble of the data unit, wherein generating the header field includes when it is determined that the data unit is to be transmitted using SC modulation, generating the header field using a first technique to indicate one or both of (i) that the data unit conforms to a first communication protocol and not a second communication protocol and (ii) whether the data unit conforms to a first PHY mode of the first communication protocol or a second PHY mode of the first communication protocol, and when it is determined that the data unit is to be transmitted using OFDM modulation, generating the header field using a second technique to indicate one or both of (i) that the data unit conforms to the first communication protocol and not the second communication protocol and (ii) whether the data unit conforms to the first PHY mode of the first communication protocol or the second PHY mode of the first communication protocol. The one or more integrated circuits are additionally configured to generate the preamble of the data unit to include at least the header field, and generate the data unit to include at least the preamble.

In other embodiments, the communication device includes any suitable combination of one or more of the following features.

The one or more integrated circuits are configured to, when it is determined that the data unit is to be transmitted using SC modulation, generate a modulation block of the header field to include an information portion and a guard interval.

The second communication protocol specifies a first guard interval sequence, and the one or more integrated circuits are configured to set the guard interval to a second guard interval sequence.

The second guard interval sequence has a low correlation with the first guard interval sequence.

The one or more integrated circuits are configured to modulate the information portion using a modulation that is rotated with respect to modulation specified for a corresponding field by the second communication protocol.

The one or more integrated circuits are configured to, when it is determined that the data unit is to be transmitted using OFDM modulation, generate at least one OFDM symbol of the header field, wherein the at least one OFDM symbol includes one or more pilot tones, and wherein the one or more integrated circuits are configured to set the one or more pilot tones to values that have flipped signs with respect to value specified for the corresponding pilot tones by the second communication protocol.

The one or more integrated circuits are configured to, when it is determined that the data unit is to be transmitted using OFDM modulation, generate two or more repetitions of encoded information bits to be included in the header field.

Generating the two or more repetitions includes flipping signs of at least some of the information bits in a first one of the two or more repetitions with respect to signs of the corresponding information bits in a second one of the two or more repetitions.

The first PHY mode is a bonded channel PHY mode that utilizes channel bonding and the second PHY mode is an individual channel PHY mode that does not utilize channel bonding.

Generating the preamble of the data unit further comprises including at least a first short training field in the preamble of the data unit.

The one or more integrated circuits are configured to when the data unit conforms to the first PHY mode, generate the preamble to include a second short training field in the preamble of the data unit, and when the data unit conforms to the second PHY mode, generate the preamble to omit the second short training field from the preamble of the data unit.

The second header field is a non-legacy header field that conforms to the first communication protocol.

The one or more integrated circuits are further configured to generate a legacy header field that conforms to the second communication protocol, and generate the preamble of the data unit to further include the legacy header field.

The one or more integrated circuits are configured to generate the legacy header to include information that indicates a duration of the data unit such that a legacy receiver device that conforms to the second communication protocol but does not conform to the first communication protocol can determine a duration of the data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium, or media, such as a magnetic disk, an optical disk, a random access memory (RAM), a read only memory (ROM), a flash memory, a memory of a processor, a tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a data unit for transmission via a communication channel, the method comprising:
    determining, at a network interface of a communication device, whether the data unit is to be transmitted using single carrier (SC) modulation or using orthogonal frequency division (OFDM) modulation;
    generating, at the network interface of the communication device, a header field to be included in a preamble of the data unit, including
        when it is determined that the data unit is to be transmitted using SC modulation, generating the header field using a first technique to allow a receiver device to auto-detect, using correlation, one or both of (i) that the data unit conforms to a first communication protocol and not a second communication protocol and (ii) whether the data unit conforms to a first PHY mode of the first communication protocol or a second PHY mode of the first communication protocol, and
        when it is determined that the data unit is to be transmitted using OFDM modulation, generating the header field using a second technique, different from the first technique, to allow the receiver device to auto-detect, using correlation, one or both of (i) that the data unit conforms to the first communication protocol and not the second communication protocol and (ii) whether the data unit conforms to the first PHY mode of the first communication protocol or the second PHY mode of the first communication protocol;
    generating, at the network interface of the communication device, the preamble of the data unit to include at least the header field, and
    generating, at the network interface of the communication device, the data unit to include at least the preamble.

2. The method of claim 1, wherein when it is determined that the data unit is to be transmitted using SC modulation, generating the header includes generating a modulation block of the header field to include an information portion and a guard interval.

3. The method of claim 2, wherein the second communication protocol specifies a first guard interval sequence, and wherein generating the header includes setting the guard interval to a second guard interval sequence, wherein the second guard interval sequence has a low correlation with the first guard interval sequence.

4. The method of claim 2, wherein generating the header field includes modulating the information portion using a modulation that is rotated with respect to modulation specified for a corresponding field by the second communication protocol.

5. The method of claim 1, wherein when it is determined that the data unit is to be transmitted using OFDM modulation, generating the header field includes generating at least one OFDM symbol that includes one or more pilot tones, and wherein the one or more pilot tones are set to values that have flipped signs with respect to value specified for corresponding pilot tones by the second communication protocol.

6. The method of claim 1, wherein when it is determined that the data unit is to be transmitted using OFDM modulation, generating the header field includes generating two or more repetitions of encoded information bits to be included in the header field, wherein generating the two or more repetitions includes flipping signs of at least some of the information bits in a first one of the two or more repetitions with respect to signs of corresponding information bits in a second one of the two or more repetitions.

7. The method of claim 1, wherein the first PHY mode is a bonded channel PHY mode that utilizes channel bonding and the second PHY mode is an individual channel PHY mode that does not utilize channel bonding.

8. The method of claim 7, wherein generating the preamble of the data unit further comprises including at least a first short training field in the preamble of the data unit, and wherein
when the data unit conforms to the first PHY mode, generating the preamble includes further including a second short training field in the preamble of the data unit, and
when the data unit conforms to the second PHY mode, generating the preamble includes omitting the second short training field from the preamble of the data unit.

9. The method of claim 1, wherein the second header field is a non-legacy header field that conforms to the first communication protocol, and wherein the method further comprises generating, at the network interface of the communication device, a legacy header field that conforms to the second communication protocol, and wherein generating the preamble of the data unit comprises generating the preamble to further include the legacy header field.

10. The method of claim 9, wherein generating the legacy header includes generating the legacy header field to include information that indicates a duration of the data unit such that a legacy receiver device that conforms to the second communication protocol but does not conform to the first communication protocol can determine a duration of the data unit.

11. A communication device, comprising:
a network interface having one or more integrated circuits configured to
determine whether a data unit is to be transmitted using single carrier (SC) modulation or using orthogonal frequency division (OFDM) modulation;
generate a header field to be included in a preamble of the data unit, wherein generating the header field includes
when it is determined that the data unit is to be transmitted using SC modulation, generating the header field using a first technique to allow a receiver device to auto-detect, using correlation, one or both of (i) that the data unit conforms to a first communication protocol and not a second communication protocol and (ii) whether the data unit conforms to a first PHY mode of the first communication protocol or a second PHY mode of the first communication protocol, and
when it is determined that the data unit is to be transmitted using OFDM modulation, generating the header field using a second technique, different from the first technique, to allow the receiver device to auto-detect, using correlation, one or both of (i) that the data unit conforms to the first communication protocol and not the second communication protocol and (ii) whether the data unit conforms to the first PHY mode of the first communication protocol or the second PHY mode of the first communication protocol;
generate the preamble of the data unit to include at least the header field, and
generate the data unit to include at least the preamble.

12. The communication device of claim 11, wherein the one or more integrated circuits are configured to, when it is determined that the data unit is to be transmitted using SC modulation, generate a modulation block of the header field to include an information portion and a guard interval.

13. The communication device of claim 12, wherein the second communication protocol specifies a first guard interval sequence, and wherein the one or more integrated circuits are configured to set the guard interval to a second guard interval sequence, wherein the second guard interval sequence has a low correlation with the first guard interval sequence.

14. The communication device of claim 12, wherein the one or more integrated circuits are configured to modulate the information portion using a modulation that is rotated with respect to modulation specified for a corresponding field by the second communication protocol.

15. The communication device of claim 11, wherein the one or more integrated circuits are configured to, when it is determined that the data unit is to be transmitted using OFDM modulation, generate at least one OFDM symbol of the header field, wherein the at least one OFDM symbol includes one or more pilot tones, and wherein the one or more integrated circuits are configured to set the one or more pilot tones to values that have flipped signs with respect to value specified for the corresponding pilot tones by the second communication protocol.

16. The communication device of claim 11, wherein the one or more integrated circuits are configured to, when it is determined that the data unit is to be transmitted using OFDM modulation, generate two or more repetitions of encoded information bits to be included in the header field, wherein generating the two or more repetitions includes flipping signs of at least some of the information bits in a first one of the two or more repetitions with respect to signs of the corresponding information bits in a second one of the two or more repetitions.

17. The communication device of claim 11, wherein the first PHY mode is a bonded channel PHY mode that utilizes channel bonding and the second PHY mode is an individual channel PHY mode that does not utilize channel bonding.

18. The communication device of claim 17, wherein generating the preamble of the data unit further comprises including at least a first short training field in the preamble of the data unit, and wherein the one or more integrated circuits are configured to
when the data unit conforms to the first PHY mode, generate the preamble to include a second short training field in the preamble of the data unit, and
when the data unit conforms to the second PHY mode, generate the preamble to omit the second short training field from the preamble of the data unit.

19. The communication device of claim 11, wherein the second header field is a non-legacy header field that conforms to the first communication protocol, and wherein the one or more integrated circuits are further configured to
generate a legacy header field that conforms to the second communication protocol, and
generate the preamble of the data unit to further include the legacy header field.

20. The communication device of claim 19, wherein the one or more integrated circuits are configured to generate the legacy header to include information that indicates a duration of the data unit such that a legacy receiver device that conforms to the second communication protocol but does not conform to the first communication protocol can determine a duration of the data unit.

\* \* \* \* \*